United States Patent
Oh et al.

(10) Patent No.: US 10,686,193 B2
(45) Date of Patent: Jun. 16, 2020

(54) NEGATIVE ELECTRODE COMPRISING MESH-TYPE CURRENT COLLECTOR, LITHIUM SECONDARY BATTERY COMPRISING THE SAME, AND MANUFACTURING METHOD THEREOF

(71) Applicant: LG CHEM, LTD., Seoul (KR)

(72) Inventors: Hyunjin Oh, Daejeon (KR); Jin Hyun Cho, Daejeon (KR); Hyunwoong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 15/657,801

(22) Filed: Jul. 24, 2017

(65) Prior Publication Data
US 2018/0026271 A1   Jan. 25, 2018

(30) Foreign Application Priority Data

Jul. 25, 2016   (KR) .................. 10-2016-0094371
Jul. 17, 2017   (KR) .................. 10-2017-0090152

(51) Int. Cl.
*H01M 4/74*   (2006.01)
*H01M 4/66*   (2006.01)
(Continued)

(52) U.S. Cl.
CPC .......... *H01M 4/74* (2013.01); *H01M 4/0435* (2013.01); *H01M 4/0471* (2013.01);
(Continued)

(58) Field of Classification Search
CPC .... H01M 4/74; H01M 4/0435; H01M 4/0471; H01M 4/134; H01M 4/1395;
(Continued)

(56) References Cited

U.S. PATENT DOCUMENTS 5,434,024 A * 7/1995 Ikeda .................. C23C 14/20
                                                            429/231.3
5,882,822 A * 3/1999 Iida .................... C25D 5/56
                                                            205/158
(Continued)

FOREIGN PATENT DOCUMENTS

CN      1938802 A      3/2007
CN    203562482 U *    4/2014
(Continued)

OTHER PUBLICATIONS

Machine translation of JP 2019-012587 (no date).*
Extended European Search Report, dated Oct. 10, 2017, for European Application No. 17182964.1.

*Primary Examiner* — Amanda C. Walke
(74) *Attorney, Agent, or Firm* — Birch, Stewart, Kolasch & Birch, LLP

(57) ABSTRACT

The present disclosure relates to a negative electrode for a lithium secondary battery comprising a mesh-type current collector and a lithium thin film, and in particular, to a negative electrode in which a lithium thin film is inserted to an opening of a current collector and empty space is formed, a lithium secondary battery comprising the same, and a manufacturing method thereof.

The present disclosure is capable of enhancing safety of the lithium secondary battery by preventing lithium dendrite growth. In addition, the present disclosure is capable of preventing stripping of the negative electrode current collector and the lithium thin film while charging and discharging the battery since adhesion efficiency increases between the negative electrode and the current collector.

7 Claims, 9 Drawing Sheets

(51) Int. Cl.
  *H01M 4/04*      (2006.01)
  *H01M 4/134*     (2010.01)
  *H01M 4/1395*    (2010.01)
  *H01M 4/38*      (2006.01)
  *H01M 10/0525*   (2010.01)
  *H01M 10/052*    (2010.01)
  *H01M 4/02*      (2006.01)

(52) U.S. Cl.
  CPC ......... *H01M 4/134* (2013.01); *H01M 4/1395* (2013.01); *H01M 4/382* (2013.01); *H01M 4/661* (2013.01); *H01M 4/667* (2013.01); *H01M 10/0525* (2013.01); *H01M 10/052* (2013.01); *H01M 2004/027* (2013.01)

(58) Field of Classification Search
  CPC ...... H01M 4/382; H01M 4/661; H01M 4/667; H01M 10/0525; H01M 10/052
  USPC ........................................................ 429/127
  See application file for complete search history.

(56) References Cited

U.S. PATENT DOCUMENTS

| | | | | |
|---|---|---|---|---|
| 8,956,764 B2* | 2/2015 | Han | ................. | H01M 4/0404 429/233 |
| 2006/0024574 A1* | 2/2006 | Yim | ................. | H01M 2/1241 429/174 |
| 2006/0204839 A1* | 9/2006 | Richards | ............ | H01M 2/0257 429/137 |
| 2007/0051620 A1* | 3/2007 | Visco | ................. | H01M 4/02 204/280 |
| 2008/0165471 A1 | 7/2008 | Kojima et al. | | |
| 2009/0274951 A1* | 11/2009 | Kinoshita | ........... | H01M 4/0404 429/94 |
| 2010/0167112 A1* | 7/2010 | Honda | ............... | H01M 4/0421 429/94 |
| 2010/0288757 A1* | 11/2010 | Akahori | ............. | B60R 16/0238 220/3.7 |
| 2012/0225351 A1* | 9/2012 | Kojima | .............. | H01M 4/0404 429/211 |
| 2013/0004856 A1* | 1/2013 | Hosoe | ................. | H01G 9/016 429/245 |
| 2013/0055559 A1 | 3/2013 | Slocum et al. | | |
| 2013/0122375 A1* | 5/2013 | Goto | ................. | C25D 1/08 429/242 |
| 2013/0177798 A1* | 7/2013 | Ueda | ................. | H01M 10/052 429/127 |
| 2013/0224582 A1 | 8/2013 | Mehata et al. | | |
| 2014/0212712 A1* | 7/2014 | Ito | ........................ | H01M 4/661 429/72 |
| 2014/0272558 A1 | 9/2014 | Xiao et al. | | |
| 2015/0037645 A1* | 2/2015 | Ramani | ............... | H01M 10/399 429/112 |
| 2015/0280212 A1* | 10/2015 | Son | ........................ | H01M 4/134 429/163 |
| 2015/0295246 A1 | 10/2015 | Son et al. | | |
| 2016/0285076 A1* | 9/2016 | Yamamoto | ............. | C22C 13/00 |
| 2017/0077546 A1* | 3/2017 | Zhamu | ................ | H01M 10/054 |
| 2017/0084913 A1* | 3/2017 | Misaki | ............... | H01M 4/0471 |
| 2017/0092956 A1* | 3/2017 | Lee | ........................ | H01M 4/74 |
| 2018/0040902 A1* | 2/2018 | Jiang | ................. | H01M 4/48 |

FOREIGN PATENT DOCUMENTS

| | | | |
|---|---|---|---|
| CN | 104040764 A | | 9/2014 |
| CN | 105009330 A | | 10/2015 |
| CN | 105074968 A | | 11/2015 |
| EP | 1734547 B1 | | 9/2012 |
| JP | 61-26260 A | | 2/1986 |
| JP | 2-309558 A | | 12/1990 |
| JP | 7-29596 A | | 1/1995 |
| JP | 11-195415 A | | 7/1999 |
| JP | 11-242956 A | | 9/1999 |
| JP | 11-283676 A | | 10/1999 |
| JP | 2011-134691 A | | 7/2011 |
| JP | 2015-213180 A | | 11/2015 |
| JP | 2019012587 A | * | 1/2019 |
| KR | 10-2011-0019101 A | | 2/2011 |
| KR | 10-2013-0042487 A | | 4/2013 |
| KR | 10-2015-0030156 A | | 3/2015 |
| KR | 10-1503572 B1 | | 3/2015 |
| KR | 10-2015-0050816 A | | 5/2015 |
| KR | 10-2016-0025032 A | | 3/2016 |
| KR | 10-2016-0027365 A | | 3/2016 |
| KR | 10-1623447 B1 | | 5/2016 |
| KR | 10-2017-0034773 A | | 3/2017 |
| WO | WO 2005/096333 A | | 10/2005 |
| WO | WO 2011/152244 A1 | | 12/2011 |
| WO | WO 2015/003123 A9 | | 1/2015 |

* cited by examiner

NEGATIVE ELECTRODE COMPRISING MESH-TYPE CURRENT COLLECTOR, LITHIUM SECONDARY BATTERY COMPRISING THE SAME, AND MANUFACTURING METHOD THEREOF

This application claims the benefit of Korean Application Nos. 10-2016-0094371 filed on Jul. 25, 2016 and 10-2017-0090152 filed on Jul. 17, 2017, all of which are herein incorporated by reference in their entirety.

FIELD OF THE INVENTION

The present disclosure relates to a negative electrode for a lithium secondary battery comprising a mesh-type current collector and a lithium thin film, and in particular, to a negative electrode in which a lithium thin film is inserted to an opening of a current collector and empty space is formed, a lithium secondary battery comprising the same, and a manufacturing method thereof.

BACKGROUND OF THE INVENTION

Interests in energy storage technologies have been increasingly higher recently. As applications are expanded to energy of mobile phones, camcorders and notebook PCs, and furthermore, to electric vehicles, efforts on the research and development of electrochemical devices have been more and more materialized.

Electrochemical devices are fields receiving most attentions in such aspects and among these, development of secondary batteries capable of charge and discharge have been the focus of attention, and in developing such batteries, research and development on the design of new electrodes and batteries for enhancing capacity density and energy efficiency have been recently progressed.

Among currently used secondary batteries, lithium secondary batteries developed in early 1990s have received attentions with advantages of having high operating voltage and significantly higher energy density compared to conventional batteries such as Ni—MH, Ni—Cd and sulfuric acid-lead batteries using an aqueous liquid electrolyte.

A lithium secondary battery is generally formed by an electrode assembly comprising a positive electrode, a negative electrode and a separator provided between the positive electrode and the negative electrode being embedded in a battery case in a laminated or wound structure, and a non-aqueous liquid electrolyte being injected thereinto.

As for a lithium electrode as the negative electrode, lithium foil attached on a planar current collector is used. In this case, lithium formation and elimination are irregular when charged and discharged producing lithium dendrite, and this leads to continuous capacity decline.

In view of the above, studies introducing a polymer protective layer or inorganic solid protective layer to a lithium metal layer, increasing a salt concentration of a liquid electrolyte, or using proper additives have been progressed. However, effects of suppressing lithium dendrite resulted from such studies are insignificant. Accordingly, solving problems through modifying a form of a lithium metal anode itself or modifying a battery structure may be an effective option.

PRIOR ART DOCUMENTS

Patent Documents

Korean Patent No. 10-1621410 "Lithium Electrode and Lithium Secondary Battery comprising the Same"

SUMMARY OF THE INVENTION

As described above, lithium dendrite of a lithium secondary battery is precipitated on a surface of a negative electrode current collector and volume expansion of a cell is sometimes caused therefrom. In view of the above, the inventors of the present disclosure have conducted studies from various angles and, as a result, have found out a method of solving such a problem caused by dendrite through modifying shape and structure of an electrode itself, and have completed the present disclosure.

Accordingly, the present disclosure is directed to providing a lithium secondary battery solving a problem of volume expansion of a cell caused by lithium dendrite through modifying shape and structure of an electrode, and having enhanced cell performance.

In view of the above, one embodiment of the present disclosure provides a negative electrode for a lithium secondary battery comprising a mesh-type anode current collector formed with a wire rod portion and an opening; and a lithium thin film formed with an inserted portion inserted to the opening of the negative electrode current collector and a non-inserted portion that is not inserted.

Another embodiment of the present disclosure provides a method for manufacturing a negative electrode for a lithium secondary battery comprising preparing a mesh-type anode current collector; placing lithium metal foil on the negative electrode current collector; and rolling the lithium metal foil and the negative electrode current collector to insert the lithium metal to an opening of the negative electrode current collector.

Still another embodiment of the present disclosure provides a lithium secondary battery comprising the negative electrode.

Figure 1:
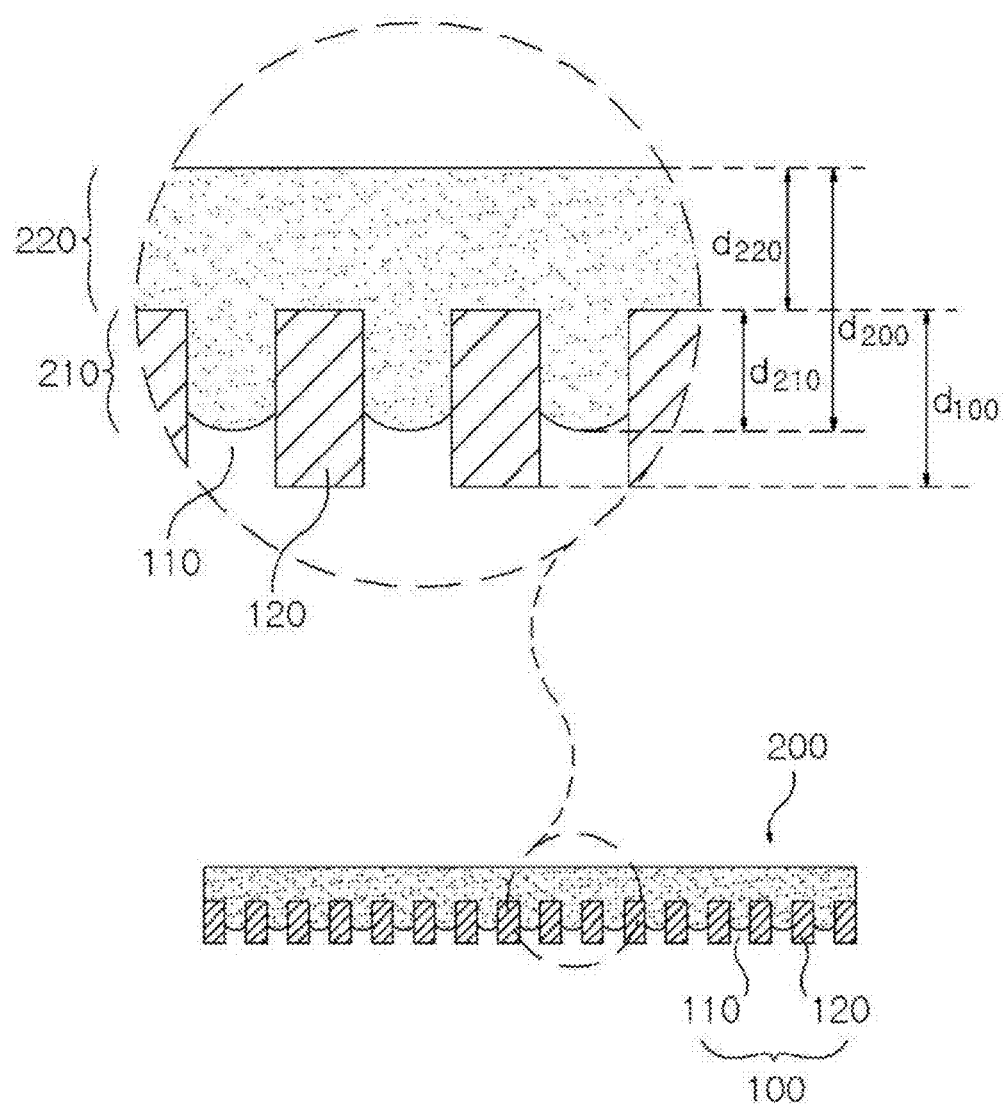
FIG. 1 is a cross-sectional view of a negative electrode for a lithium secondary battery comprising a lithium thin film inserted to an opening of a negative electrode current collector according to the present disclosure.

100. Anode Current Collector
110. Opening
120. Wire Rod Portion
200. Lithium Thin Film
210. Inserted portion
220. Non-Inserted portion
300. Pressure Roller

DETAILED DESCRIPTION OF THE EMBODIMENTS

Hereinafter, embodiments of the present disclosure will be described in detail with reference to the accompanying drawings so that those skilled in the art may readily implement the present disclosure. However, the present disclosure may be implemented in various different forms, and is not limited to the embodiments described herein.

In the drawings, parts not relevant to the descriptions are not included in order to clearly describe the present disclosure, and like reference numerals are used for like elements throughout the specification. In addition, sizes and relative sizes of constituents shown in the drawings are unrelated to actual scales, and may be reduced or exaggerated for clarity of the descriptions.

FIG. 1 is a cross-sectional view of a negative electrode for a lithium secondary battery comprising a lithium thin film inserted to an opening of a negative electrode current collector according to the present disclosure. When referring to FIG. 1, the present disclosure provides a negative electrode for a lithium secondary battery comprising a mesh-type anode current collector (100) formed with a wire rod portion (120) and an opening (110); and a lithium thin film (200) formed with an inserted portion (210) inserted to the opening (110) of the negative electrode current collector (100) and a non-inserted portion (220) that is not inserted.

The negative electrode for a lithium secondary battery according to the present disclosure has a structure in which the lithium thin film (200) is inserted while one surface thereof adjoins on an upper surface of the mesh-type anode current collector (100), and this leaves empty space in the opening (110) as a part of the lithium thin film (200) is inserted to the opening (110) of the negative electrode current collector (100). This space induces lithium dendrite formation preventing volume expansion of a cell.

In the present disclosure, the electrode material formed on the negative electrode current collector (100) is preferably a lithium thin film (200). Lithium thin film (200) has malleability and ductility, unique properties of a metal film, and changes its form while spreading thinly when applying a pressure, and therefore, may be inserted to the mesh-type anode current collector opening (110) with only a rolling process.

However, among materials used as a negative electrode in a lithium secondary battery, a negative electrode active material that comprises lithium in a form that is not a thin film form is normally prepared into a slurry mixture and a coating process coating the slurry mixture on a negative electrode current collector is carried out, and unlike lithium in a thin film form, such a slurry mixture is difficult to be inserted to an opening of a mesh-type anode current collector through a coating film-forming process or a rolling process thereafter, and cracks may also occur due to a pressure applied in the rolling process. Even when the slurry mixture inserted to an opening of a negative electrode current collector by controlling viscosity of the slurry mixture, there is a problem in that controlling the viscosity enough to secure empty space to a target level aimed in the present disclosure is very difficult.

Accordingly, a lithium thin film (200) is preferably used as a negative electrode material in the present disclosure, and an inserted portion thickness (d210) of such a lithium thin film (200) is controlled to be 20% to 60% of the thickness of the whole lithium thin film. In other words, space filled with the inserted portion (210) of the lithium thin film is from 20% to 60% of the thickness of the whole lithium thin film, and accordingly, empty space is preserved in the opening (110) space. Dendrite is formed in such remaining space of the opening (110) while gone through charge and discharge, and as a result, volume expansion of a cell may be prevented.

Herein, as for a non-inserted portion thickness (d220) of the lithium thin film (200), it is preferred that 40% to 80% of the total lithium thin film thickness (d200) is left and only the rest is inserted. When the lithium thin film (200) is not completely inserted and a part thereof is left, space remains inside the negative electrode current collector (100), and effects described above are secured. In addition, as both surfaces of the lithium thin film (200) are exposed to a liquid electrolyte, a stable SEI membrane is formed on the both surfaces preventing the Li metal surface from being exposed, and as a result, electrolyte decomposition caused from charge and discharge may be prevented.

As for a thickness (d200) of the lithium thin film, those having a thickness of 10 μm to 800 μm are selected, and selecting those having a larger thickness than the negative electrode current collector is preferred. The reason is to secure a sufficient non-inserted portion (220) thickness even after the lithium thin film (200) is inserted to the opening (110) of the negative electrode current collector.

In addition, as the negative electrode current collector (100), those having a thickness range of 3 μm to 500 μm are used. When the negative electrode current collector has a thickness of less than 3 μm, a current collecting effect decreases, and an opening (110) having a sufficient size to collect lithium dendrite is not secured. Meanwhile, the thickness being greater than 500 μm has a problem of reducing processability when assembling a cell through folding.

An effect of suppressing lithium dendrite growth is excellent as the size of one opening (110) of the negative electrode current collector (100) is smaller and the percentage of the opening (110) is higher. More specifically, as the wire rod portion (120) of the negative electrode current collector (100), those having a line width of 50 μm to 500 μm and line spacing of 100 μm to 1 mm may be selected, and the size of one opening (110) that such a wire rod portion (120) forms is preferably from 10 μm to 300 μm in securing the above-mentioned effects.

In addition, as for the percentage of the opening (110) in the negative electrode current collector (100), an aperture ratio, the percentage of the area occupied by the opening (110) region, is preferably from 20% to 80% based on the total area 100% of the negative electrode current collector (100). When the aperture ratio is less than 20%, the effect of inducing precipitation and elimination reactions of lithium dendrite, a goal of the present disclosure, may not be secured, and when the aperture ratio is greater than 80%, the area of contact between the negative electrode current collector and the lithium metal layer relatively decreases, which is not proper in performing a role as a negative electrode current collector, and as a result, battery performance declines.

The shape of the opening (110) formed by such a wire rod portion (120) of the negative electrode current collector (100) is not limited, and examples thereof may comprise a circular, oval or polygonal shape.

The negative electrode current collector (100) is not particularly limited as long as it has high conductivity without inducing chemical changes in a battery, and may be selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. As the negative electrode current collector, a copper thin plate is generally used.

The negative electrode for a lithium secondary battery in which a part of a lithium thin film is inserted to a negative electrode current collector according to the present disclosure is capable of enhancing safety of the lithium secondary battery by increasing a surface area of contact between the lithium thin film and the negative electrode current collector, uniformizing electron distribution inside the lithium electrode, and inducing lithium dendrite precipitation in empty space inside the current collector.

Furthermore, the present disclosure provides a negative electrode for a lithium secondary battery comprising a mesh-type anode current collector formed with a wire rod portion and an opening; a lithium thin film formed with an inserted portion inserted to the opening of the negative electrode current collector and a non-inserted portion that is not inserted; and a protection structure formed on a surface opposite to the lithium thin film that the negative electrode current collector faces, wherein the protection structure is formed with an organic polymer portion and an inorganic material portion, and the organic polymer portion is formed on a surface opposite to the lithium thin film that the wire rod portion adjoins and the inorganic material portion is formed on a surface opposite to the lithium thin film corresponding to the opening.

The protection structure according to the present disclosure may provide an ion path between a negative electrode and an electrolyte. Such a protection structure has a form of an inorganic material filling space between frames that the organic polymer portion forms, and although an inorganic material cell or layer formed with specific ceramic/glassy may comprise pin-holes, cracks and/or crystal grain-based defects that may spread through the whole cell or layer, the presence of a number of ion paths may minimize the influence of defects in any one ion path. Accordingly, when defects are present in the protection structure, this is typically much less fatal compared to when present inside a protection structure comprising one or more continuous ceramic layers. For example, defects may be isolated (for example, at least partly surrounded by polymer materials), and therefore, the defects spreading to other ion paths (for example, inorganic material-filled cavity) may be reduced or avoided.

The organic polymer portion provides advantageous mechanical properties such as flexibility and strength of the protection structure. Placing a cell filled with an inorganic material inside a polymer frame may reduce weakness of the inorganic material-filled cavity for crack mechanism. The material is not limited, and for example, may be selected from among polyvinyl alcohol, polyisobutylene, epoxy, polyethylene, polypropylene, polytetrafluoroethylene and combinations thereof as a non-ionic conductive polymer.

The inorganic material portion may be a ceramic-based or glassy-based material as a material ionic communicating with the lithium thin film, and for example, may be selected from among $Li_2O$, $Li_3N$, $Al_2O_3$, $ZrO_2$, $SiO_2$, $CeO_2$, $Al_2TiO_5$, oxy-sulfide glass and combinations thereof.

The protection structure may be prepared by, for example, preparing a frame with an organic polymer portion following a wire rod portion that forms a mesh-form of a negative electrode current collector, and then filling the space therebetween with an inorganic material, and as the method, methods such as electron beam deposition, sputtering and thermal deposition may be used.

Figure 2:
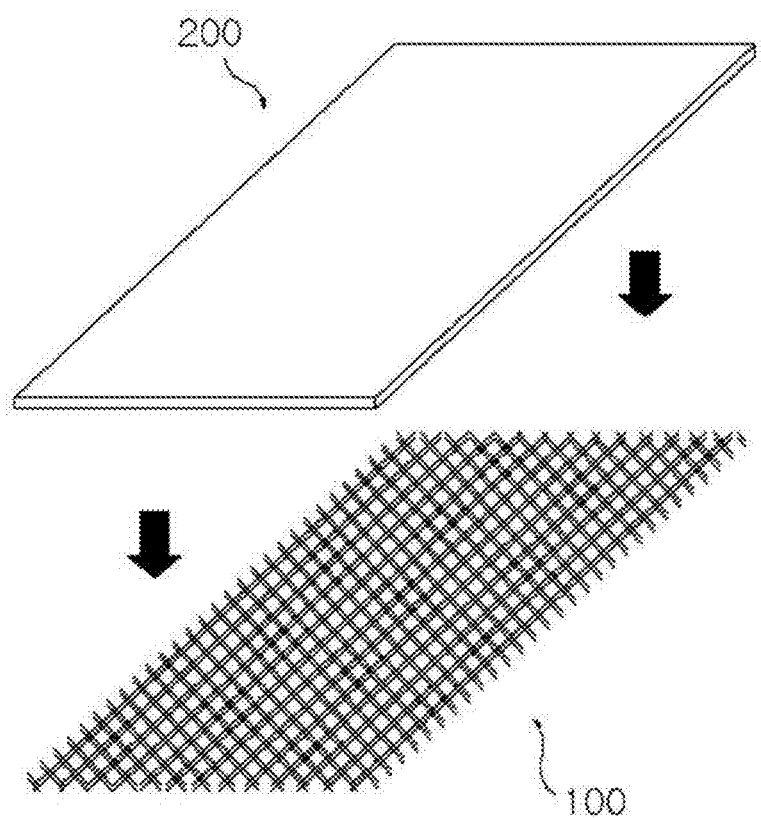
FIG. 2 is a perspective view describing a method for manufacturing a negative electrode for a lithium secondary battery according to the present disclosure.
Figure 3:
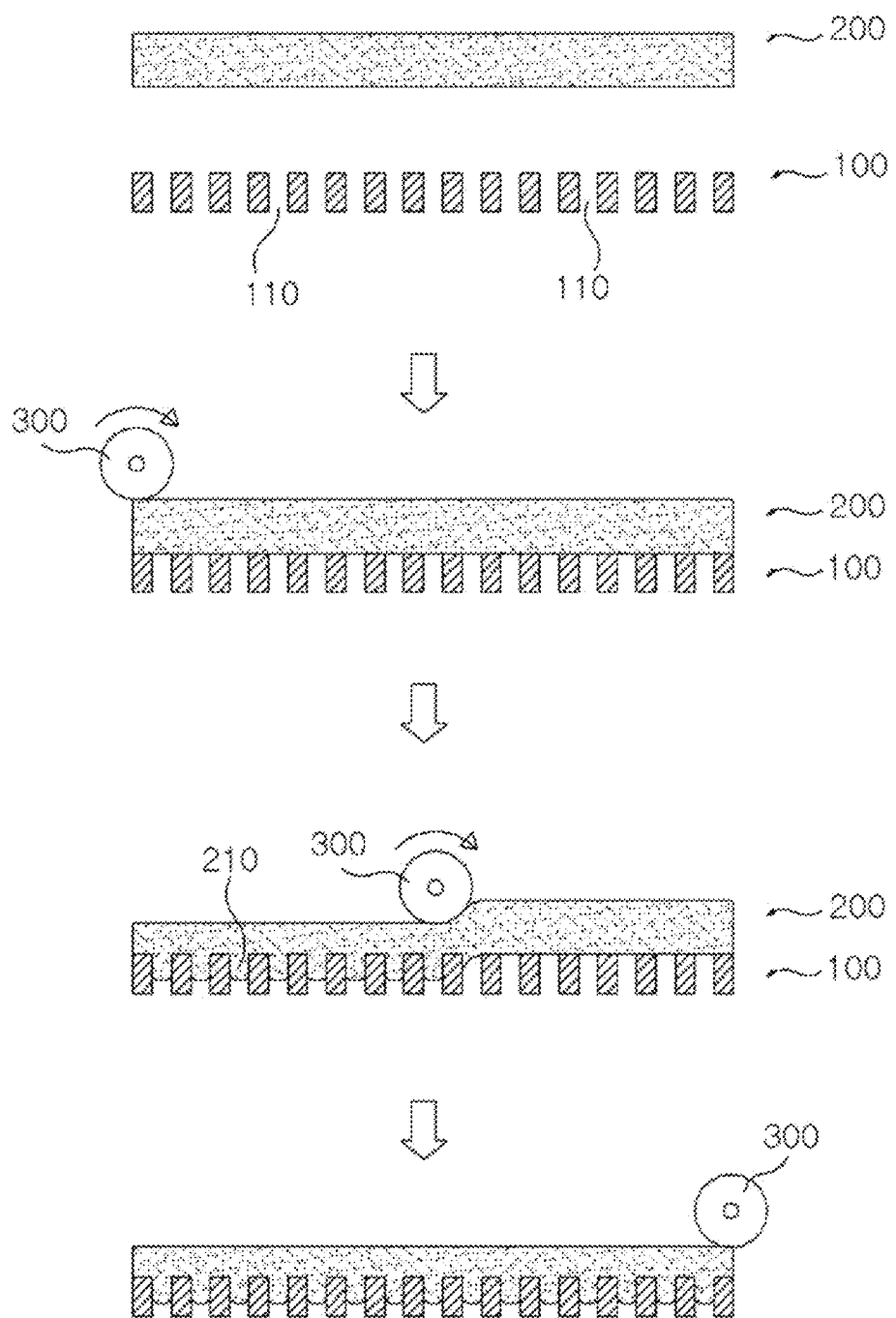
FIG. 3 is a step mimetic diagram describing a method for manufacturing a negative electrode for a lithium secondary battery according to the present disclosure.

FIG. 2 and FIG. 3 are a perspective view and a step mimetic diagram describing a method for manufacturing a negative electrode for a lithium secondary battery according to the present disclosure. Inserting a lithium thin film (200) to an opening (110) that a mesh-type anode current collector (100) forms may be accomplished by placing the lithium thin film (200) on the negative electrode current collector (100) and performing a rolling process. More specifically, the present disclosure provides a method for manufacturing a negative electrode for a lithium secondary battery comprising i) preparing a mesh-type anode current collector (100); ii) placing a lithium thin film (200) on the negative electrode current collector (100); and iii) rolling the lithium thin film (200) and the negative electrode current collector (100) to insert the lithium thin film (200) to an opening (110) of the negative electrode current collector (100).

The rolling may be carried out using common methods, and for example, the lithium thin film (200) may be inserted to an opening (110) of the negative electrode current collector (100) using a method of compressing with a pressure roller (300) provided in a roll press and the like, or compressing over the whole electrode surface using a plate-like press.

Particularly, in such a rolling process, a pressure of 10 $kg/cm^2$ to 100 $ton/cm^2$ may be applied, and heating to a temperature of 100° C. to 200° C. may be carried out. Heat treatment at the above-mentioned temperature includes either heating while carrying out a rolling process, or carrying out a rolling process while being heated before carrying out the rolling process. By controlling temperature and pressure conditions as above, the degree of lithium thin film insertion may be controlled, and preferably, the lithium thin film may be rolled so as to satisfy the inserted portion thickness (d210) range described above.

As for a lithium secondary battery according to the present disclosure, constitutions other than the structure and the properties of the negative electrode described above may be prepared through known technologies implemented by those skilled in the art, and will be specifically described below.

A positive electrode according to the present disclosure may be prepared into a positive electrode form by forming film on a positive electrode current collector using a composition comprising a positive electrode active material, a conductor and a binder.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCo_{1-y}MnyO_2$, $LiNi_{1-y}MnyO_2$ ($0\le y<1$), $Li(Ni_aCo_bMn_c)O_4$ ($0<a<2$, $0<b<2$, $0<c<2$, $a+b+c=2$), $LiMn_{2-z}NizO_4$, $LiMn_{2-z}CozO_4$ ($0<z<2$), $LiCoPO_4$ and LiFePO$_4$, or a mixture of two or more types thereof may be used. In addition, sulfides, selenides, halides and the like may also be used in addition to such oxides. In more preferred examples, the positive electrode active material may be LiCoO$_2$ suitable for a high power battery.

The conductor is a component for further enhancing conductivity of a positive electrode active material, and non-limiting examples thereof may comprise graphite such as natural graphite or artificial graphite; carbon black such as carbon black, acetylene black, Ketjen black, channel black, furnace black, lamp black and thermal black; conductive polymers such as carbon fiber or metal fiber; metal powders such as fluorocarbon, aluminum and nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may comprise polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The positive electrode composition may be coated on a positive electrode current collector using common methods known in the art, and various methods such as a dipping method, a spray method, a roll coat method, a gravure printing method, a bar coat method, a die coating method, a comma coating method or a mixed method thereof may be used.

The positive electrode and the positive electrode composition gone through such a coating process are dried, and through the drying process, solvent or dispersion medium evaporation, compactness of the coating layer and adhesion between the coating layer and the current collector and the like are obtained. Herein, the drying is carried out using common methods, and is not particularly limited.

A separator according to the present disclosure is not particularly limited in the material and, as a material physically separating a positive electrode and a negative electrode, and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte is particularly preferred. For example, a polyolefin-based porous membrane or non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or a polymer mixing these may be used.

As the non-woven fabric other than the polyolefin-based non-woven fabric described above, non-woven fabric formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyether ether ketone, polyester and the like alone, or a polymer mixing these may be used, and, as a fiber form forming a porous web, such non-woven fabric comprises a spunbond or meltblown form formed with long fibers.

The thickness of the separator is not particularly limited, but is preferably in a range of 1 µm to 100 µm, and more preferably in a range of 5 µm to 50 µm. When the separator has a thickness of less than 1 µm, mechanical properties may not be maintained, and when the thickness is greater than 100 µm, the separator functions as a resistive layer declining battery performance.

A pore size and porosity of the separator are not particularly limited, however, the pore size is preferably from 0.1 µm to 50 µm, and the porosity is preferably from 10% to 95%. When the separator has a pore size of less than 0.1 µm or porosity of less than 10%, the separator functions as a resistive layer, and when the pore size is greater than 50 µm or the porosity is greater than 95%, mechanical properties may not be maintained.

An electrolyte capable of being used in the present disclosure may be a non-aqueous liquid electrolyte or a solid electrolyte not reacting with lithium metal, but is preferably a non-aqueous electrolyte, and comprises an electrolyte salt and an organic solvent.

The electrolyte salt included in the non-aqueous liquid electrolyte is a lithium salt. As the lithium salt, those commonly used in liquid electrolytes for a lithium secondary battery may be used without limit. For example, an anion of the lithium salt may comprise any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included.

Specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may comprise fluoroethylene carbonate (FEC) and the like, but are not limited thereto.

Specific examples of the linear carbonate compound may typically comprise any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a high viscosity organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous liquid electrolyte may be injected at a proper stage in an electrochemical device manufacturing process depending on a final product manufacturing process and required properties. In other words, the non-aqueous liquid electrolyte may be injected at a stage prior to assembling an electrochemical device or at a final stage of electrochemical device assembly.

The lithium secondary battery according to the present disclosure may go through lamination (stack) and folding processes of a separator and an electrode in addition to winding, a general process. In addition, the battery case may be cylindrical, square, a pouch-type, a coin-type or the like.

As above, the lithium secondary battery according to the present disclosure stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

Accordingly, another embodiment of the present disclosure provides a battery module comprising the lithium secondary battery as a unit cell, and a battery pack comprising the same. The battery module or the battery pack may be used as a power supply of any one or more of medium to large sized devices among power tools; electric vehicles comprising electric vehicles (EV), hybrid electric vehicles and plug-in hybrid electric vehicles (PHEV); or systems for power storage.

Hereinafter, the present disclosure will be described in detail with reference to examples. However, examples according to the present disclosure may be modified to various different forms, and the scope of the present disclosure is not to be construed as being limited to the examples described below. The examples of the present disclosure are provided to those having average knowledge in the art in order to more completely describe the present disclosure.

EXAMPLE: MANUFACTURE OF LITHIUM SECONDARY BATTERY

Example 1

Figure 4:
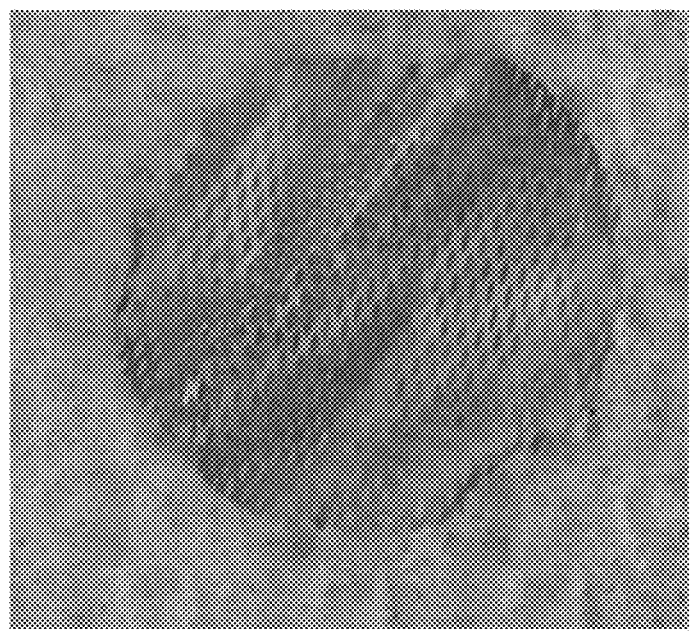
FIG. 4 is an image of a mesh-type anode current collector used in Example 1 of the present disclosure.
Figure 5:
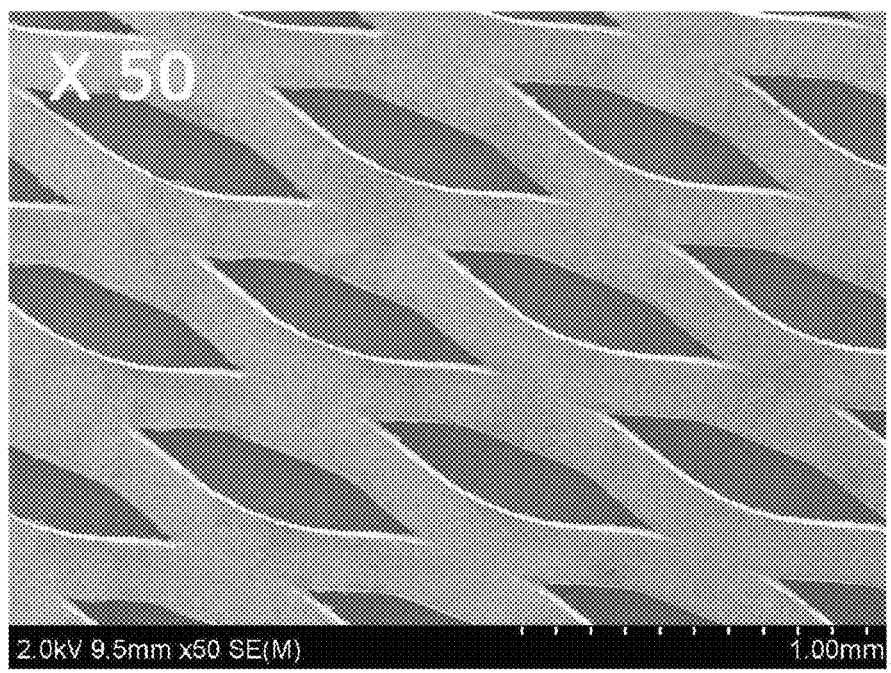
FIG. 5 is a SEM image of a mesh-type anode current collector used in Example 1 of the present disclosure.
Figure 6:
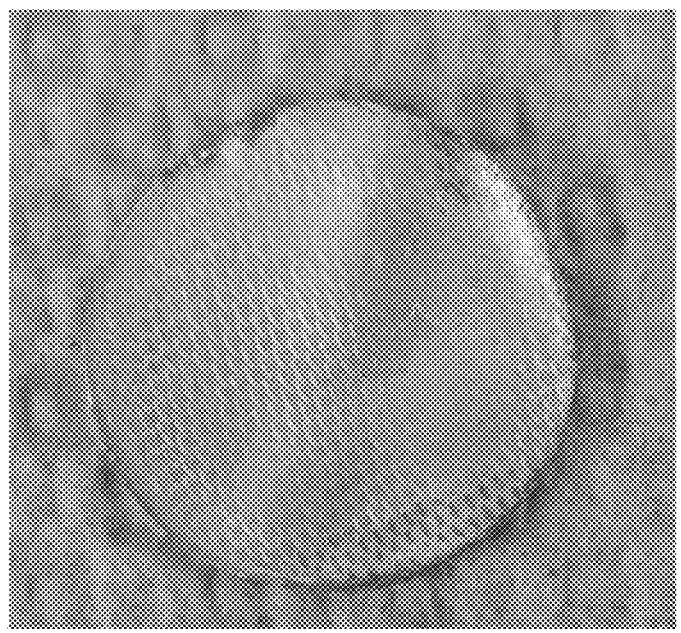
FIG. 6 is an image of a negative electrode for a lithium secondary battery according to Example 1 of the present disclosure.
Figure 7:
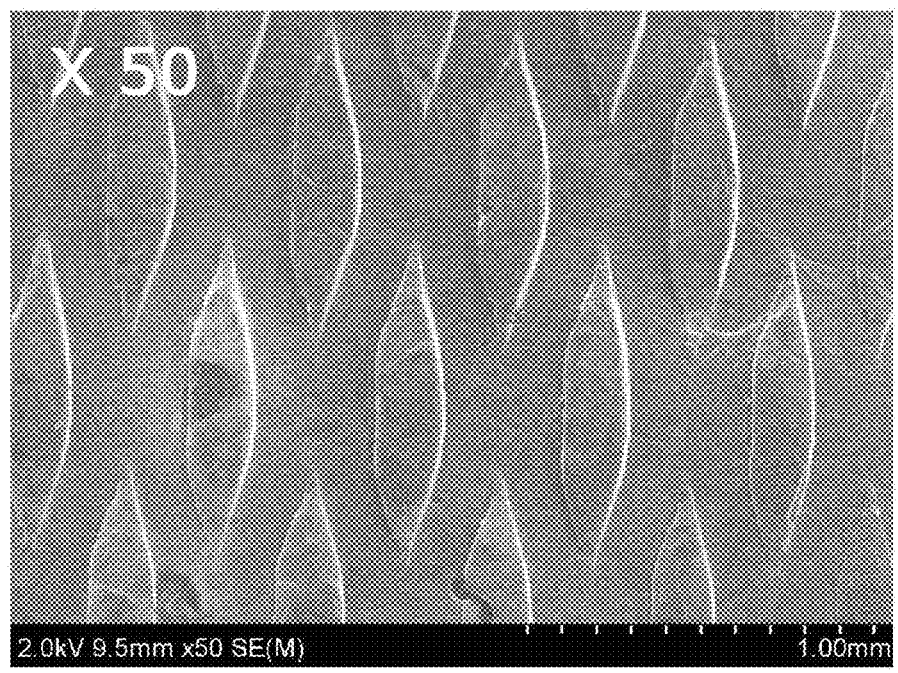
FIG. 7 is a SEM image of a negative electrode for a lithium secondary battery according to Example 1 of the present disclosure.

Lithium foil having a thickness of 40 μm was placed on a copper mesh having a thickness of 25 μm (illustrated in FIG. 4 and FIG. 5) as a negative electrode current collector, a pressure was applied so that 50% of the thicknesses of the lithium foil was inserted, and the result was roll pressed to prepare a negative electrode (illustrated in FIG. 6 and FIG. 7).

Cathode active material:conductor (carbon black):binder (KF9700) were formed as a film in a composition of 95.5:2.0:2.5 on aluminum foil having a thickness of 12 μm as a positive electrode current collector to prepare a positive electrode.

A separator coating SRS on both surfaces of a 8 μm polyethylene (PE) material each to a thickness of 2.5 μm was used as a separator to prepare a secondary battery. FEC/DEC was used as an electrolyte, and a liquid electrolyte containing 1 M of $LiPF_6$ and 0.5 wt % of additives was used to manufacture a lithium secondary battery.

Example 2

A lithium secondary battery was manufactured in the same manner as in Example 1 except that lithium foil having a thickness of 40 μm was placed on a copper mesh having a thickness of 25 μm (illustrated in FIG. 4 and FIG. 5) as the negative electrode current collector, and the thickness was controlled so that 40% of the thicknesses of the lithium foil was inserted.

Example 3

A lithium secondary battery was manufactured in the same manner as in Example 1 except that lithium foil having a thickness of 40 μm was placed on a copper mesh having a thickness of 25 μm (illustrated in FIG. 4 and FIG. 5) as the negative electrode current collector, and the thickness was controlled so that 30% of the thicknesses of the lithium foil was inserted.

Example 4

A lithium secondary battery was manufactured in the same manner as in Example 1 except that lithium foil having a thickness of 40 μm was placed on a copper mesh having a thickness of 25 μm (illustrated in FIG. 4 and FIG. 5) as the negative electrode current collector, and the thickness was controlled so that 20% of the thicknesses of the lithium foil was inserted.

Example 5

A lithium secondary battery was manufactured in the same manner as in Example 1 except that lithium foil having a thickness of 40 μm was placed on a copper mesh having a thickness of 25 μm (illustrated in FIG. 4 and FIG. 5) as the negative electrode current collector, and the thickness was controlled so that 10% of the thicknesses of the lithium foil was inserted.

Comparative Example 1

A lithium secondary battery was manufactured in the same manner as in Example 1 except that copper foil having a thickness of 20 μm was used as the negative electrode current collector, and the rolling process of the negative electrode was not carried out.

Test Example 1

Figure 8:
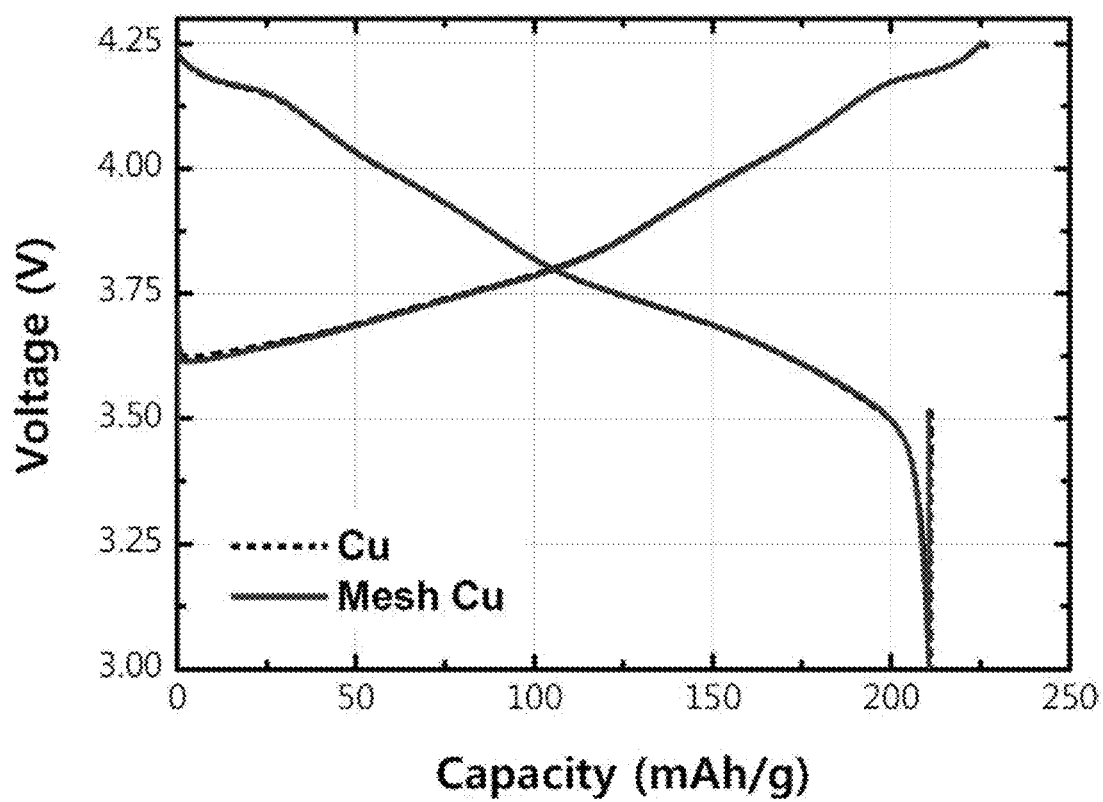
FIG. 8 shows initial capacity and efficiency data of lithium secondary batteries using anodes according to Example 1 and Comparative Example 1 of the present disclosure.

For the lithium secondary batteries of Examples 1 to 5 and Comparative Example 1, a charge and discharge test was carried out under a condition of 0.1 C charge/0.1 C discharge, and the results are shown in FIG. 8 and summarized in the following Table 1.

TABLE 1

|  | Charge Capacity (mAh/g) | Discharge Capacity (mAh/g) | Efficiency (%) |
|---|---|---|---|
| Example 1 | 225 | 210 | 93.22 |
| Example 2 | 224 | 209 | 93.30 |
| Example 3 | 225 | 209 | 92.88 |
| Example 4 | 226 | 210 | 92.92 |
| Example 5 | 224 | 209 | 93.30 |
| Comparative Example 1 | 226 | 210 | 93.14 |

As shown in Table 1, initial charge and discharge capacity and efficiency of the lithium secondary batteries of Examples 1 to 5 and Comparative Example 1 were similar.

Test Example 2

Figure 9:
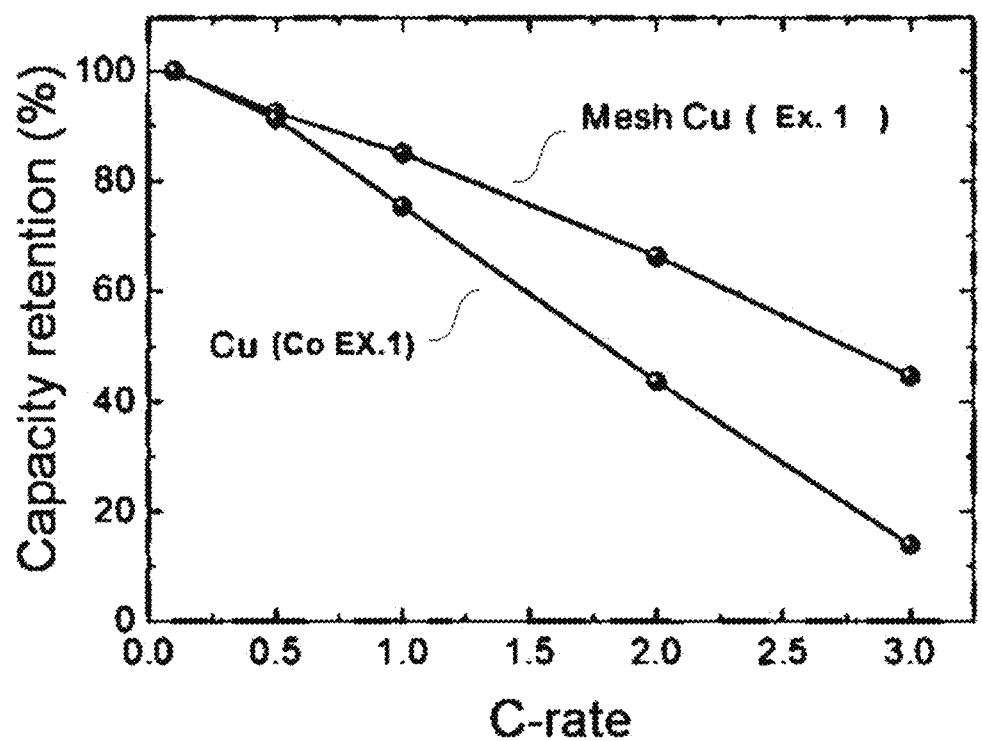
FIG. 9 shows data comparing rate performance of lithium secondary batteries using anodes according to Example 1 and Comparative Example 1 of the present disclosure.

FIG. 9 and table 2 shows data comparing rate performance of the lithium secondary batteries using the negative electrodes according to Examples 1 to 5 and Comparative Example 1 of the present disclosure.

TABLE 2

| | Capacity Retention (%, Compared to 0.1 C) | | | | | |
|---|---|---|---|---|---|---|
| Discharge C-rate | Example 1 | Example 2 | Example 3 | Example 4 | Example 5 | Comparative Example 1 |
| 0.5 C/0.1 C | 92.50 | 92.30 | 92.10 | 91.95 | 91.80 | 91.37 |
| 1.0 C/0.1 C | 85.05 | 83.55 | 82.10 | 80.05 | 78.05 | 75.46 |
| 2.0 C/0.1 C | 66.40 | 63.35 | 60.20 | 55.05 | 51.05 | 43.63 |
| 3.0 C/0.1 C | 44.60 | 38.66 | 32.55 | 27.05 | 22.10 | 13.99 |

The capacity retention rate was identified while fixing the charge rate and increasing the discharge C-rate. The results described in the table indicates capacity expression with respect to 0.1 C, and the 0.1 C capacity was identically expressed in the lithium secondary batteries of Example 1 and Comparative Example 1. However, when increasing the discharge rate, the lithium secondary batteries of Examples 1 to 5 had a higher capacity retention rate compared to the lithium secondary battery of Comparative Example 1. The difference became larger as the C-rate increased. When discharging with 2.0 C, the lithium secondary battery of Example 1 exhibited a capacity retention rate of 66%, however, the lithium secondary battery of Comparative Example 1 had a capacity retention ratio of 44%, and the difference was approximately 22%. The lithium secondary batteries of Examples 2 to 5 also exhibited a superior capacity retention rate compared to Comparative Example 1.

In other words, when using mesh Cu, the contact area between Li metal and Cu increases, and resistance inside a cell is reduced as electrical conductivity becomes superior. Besides, cell performance is enhanced while dendrite formation is induced inside empty space of an opening described above. When using general Cu foil, interfacial resistance between a separator and Li metal increases while dendrite is formed on the Li metal surface touching the separator when charged and discharged, however, when using Mesh Cu, a phenomenon of increasing interfacial resistance between Li metal and a separator may be prevented even after charge and discharge as dendrite formation is induced inside empty space of an opening.

The negative electrode for a lithium secondary battery in which a part of a lithium thin film is inserted to a negative electrode current collector according to the present disclosure is capable of enhancing performance of the lithium secondary battery by increasing a surface area of contact between the lithium thin film and the negative electrode current collector, and is capable of enhancing safety of the lithium secondary battery by preventing lithium dendrite growth when driving the lithium secondary battery through uniformizing electron distribution inside the lithium electrode.

In addition, volume expansion of a cell can be prevented as lithium dendrite formation is induced in empty space left while a part of the lithium thin film is inserted to an opening of the negative electrode current collector.

Furthermore, when compared to existing simple joint structures, an inserted portion of the lithium thin film and an opening of the negative electrode current collector are connected in a fitted manner and adhesion efficiency can be enhanced therefrom, and therefore, stripping of the negative electrode current collector and the lithium thin film can be prevented while charging and discharging the battery.

What is claimed is:

1. A negative electrode for a lithium secondary battery comprising:
    a mesh-type anode current collector formed with a wire rod portion and an opening; and
    a lithium thin film formed with an inserted portion inserted to the opening of the negative electrode current collector and a non-inserted portion that is not inserted,
    wherein a thickness of the inserted portion of the lithium thin film is 20% to 60% of a thickness of the whole lithium thin film,
    wherein a thickness of the non-inserted portion of the lithium thin film is 40% to 80% of a thickness of the whole lithium thin film, and
    wherein the thickness of the lithium thin film is thicker than the thickness of the negative current collector.

2. The negative electrode for a lithium secondary battery of claim 1, wherein a thickness of the lithium thin film is from 10 μm to 800 μm.

3. The negative electrode for a lithium secondary battery of claim 1, wherein the wire rod portion of the negative electrode current collector has a line width of 50 μm to 500 μm and line spacing of 100 μm to 1 mm.

4. The negative electrode for a lithium secondary battery of claim 1, wherein a shape of the opening of the negative electrode current collector is circular, oval or polygonal.

5. The negative electrode for a lithium secondary battery of claim 1, wherein an aperture ratio of the negative electrode current collector is from 20% to 80%.

6. The negative electrode for a lithium secondary battery of claim 1, wherein a thickness of the negative electrode current collector is from 3 μm to 500 μm.

7. The negative electrode for a lithium secondary battery of claim 1, wherein the negative electrode current collector is one or more types selected from the group consisting of copper, aluminum, stainless steel, zinc, titanium, silver, palladium, nickel, iron, chromium, alloys thereof and combinations thereof.

* * * * *